Sept. 29, 1959     F. W. SULLIVAN, JR     2,906,674
PROCESS FOR THE TREATMENT OF ACID SLUDGE
Filed Sept. 6, 1956
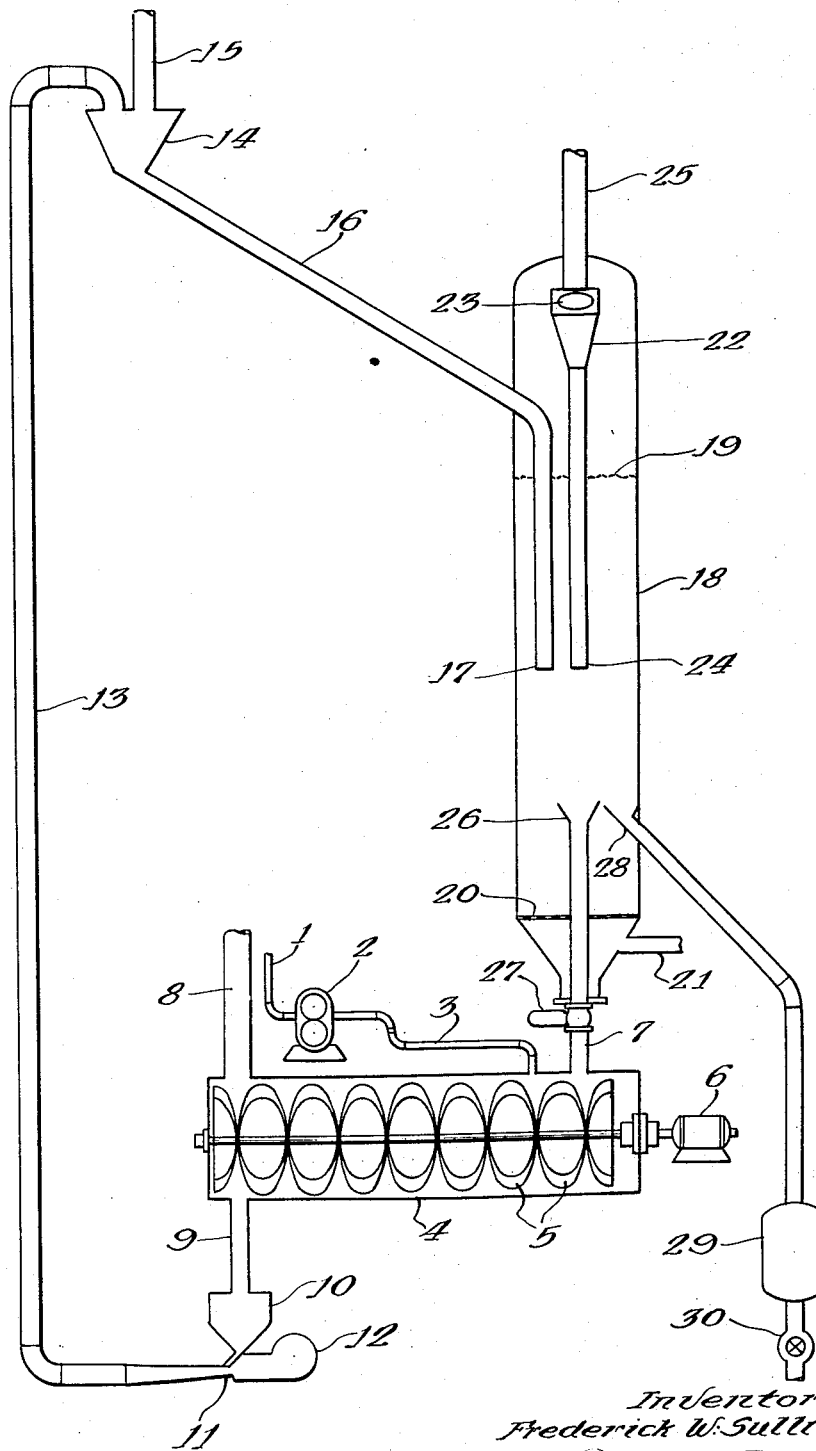
Inventor:
Frederick W. Sullivan, Jr.
By: [signature]
His Agent United States Patent Office 2,906,674
Patented Sept. 29, 1959

2,906,674

PROCESS FOR THE TREATMENT OF ACID SLUDGE

Frederick W. Sullivan, Jr., Madison, N.J.

Application September 6, 1956, Serial No. 608,397

3 Claims. (Cl. 202—14)

This invention relates to a process for the treatment of acid sludge whereby this material in converted into a chemically reactive and activatable acid sludge coke having a low content of volatile combustible matter.

The purification of hydrocarbons or hydrocarbon mixtures frequently involves treatment of hydrocarbons or hydrocarbon mixtures with strong sulfuric acid or fuming sulfuric acid. Such acid treating processes are commonly applied to hydrocarbons and hydrocarbon mixtures such as coal tar fractions, petroleum naphthas and petroleum fractions for the production of lubricants, white oils and the like. During acid treating, a heavy viscous acid sludge is produced which is immiscible with hydrocarbons and can be separated from the treated hydrocarbon or hydrocarbon mixture with more or less ease.

Since acid sludge contains the greater part of the treating acid employed, many methods have been developed for the recovery of as much of the acid present therein as possible. Preferably, the acid values of acid sludge are recovered by thermal decomposition of the sludge. On heating acid sludge to a somewhat elevated temperature, it decomposes with the production of sulfur dioxide, non-condensible gas, water vapor, liquid hydrocarbons and the like, leaving a solid residue of acid sludge coke. The sulfur dioxide is oxidized to sulfur trioxide which in turn is converted into sulfuric acid. By this procedure it is possible to recover a large part of the acid values of acid sludge in the form of strong or fuming sulfuric acid uncontaminated with carbonaceous materials.

The heat required for the thermal decomposition of acid sludge is conventionally furnished by heated acid sludge coke. In conventional acid sludge thermal decomposition processes two heaters are used, the first discharging into the second. Acid sludge coke is introduced into the first heater and during passage therethrough is brought to an elevated temperature. Heated acid sludge coke passes from the first heater to the second and the acid sludge to be decomposed is pumped on to the heated acid sludge coke at the entrance to the second heater. As the resulting mixture passes through the second heater the acid sludge is decomposed. Gaseous products are recovered and the sulfur dioxide is converted to sulfuric acid by conventional methods and means. A portion of the acid sludge coke discharged from the second heater is recycled to the entrance of the first heater for the purposes previously described while the net production of acid sludge coke is sent to storage.

In such decomposition processes, the temperature at the exit of the second heater is conventionally maintained in the approximate range 200–260° C., more or less, while the temperature at the exit of the first heater is conventionally maintained in the approximate range 230–450° C., more or less. Due to the small difference in exit temperatures between the two heaters, the weight ratio of heated acid sludge coke to acid sludge charged to the second heater must be high in order that the heated acid sludge coke possess sufficient contained heat to heat and thermally decompose the acid sludge. In conventional processes, this weight ratio of heated acid sludge coke to acid sludge is at least 5:1 and usually much higher—up to 30:1 or even more. These high ratios result in high investment and operating costs.

In addition, acid sludge coke produced in operations such as have been described is of limited utility. In such operations, the net production of acid sludge coke is withdrawn from the exit of the second heater, the maximum temperature of such material conventionally being 260° C., as previously mentioned. Such acid sludge coke has a high content of volatile combustible matter, ranging from 20 to 35%. This material is unsuited for use as a raw material in various chemical reactions conducted at high temperatures. If an attempt is made to use such acid sludge coke of high volatile combustible matter content as a source of carbon in high temperature reactions, the coke releases part or all of its volatile content and this volatile matter contaminates the resulting reaction product or results in other operating difficulties.

I have found that if acid sludge coke is heated in the first heater to a temperature in the range 500–750° C., more or less, preferably to a temperature in the range 600–750° C., more or less, the required weight ratio of so heated acid sludge coke to acid sludge charged to the second heater is low and the net production of acid sludge coke withdrawn from the first heater operating in this temperature range is readily activatable, exhibits a high chemical reactivity and a low content of volatile combustible matter. Obviously, the required weight ratio of heated acid sludge coke to acid sludge and the volatile combustible matter content of the net production of acid sludge coke both decrease as the temperature maintained in the first heater is increased. Accordingly, under most circumstances, it is desirable to maintain the first heater at a temperature in the upper portion of the preferred range previously given. When operating in this way and charging an acid sludge from white oil treating having a sulfuric acid content of about 55%, the required weight ratio of heated acid sludge coke to acid sludge is 2:1 to 3:1 or even somewhat lower and the volatile combustible matter content of the net production of acid sludge coke is well below 5%.

One object of this invention is to provide a new and improved process for the production of acid sludge coke.

Another object of this invention is to provide a new and improved process for the production of acid sludge coke having a low content of volatile combustible matter.

A further object of this invention is to provide a new and improved process for the production of acid sludge coke exhibiting a high chemical reactivity.

An additional object of this invention is to provide a new and improved process for the production of activatable acid sludge coke.

Other objects of this invention will become apparent as the description thereof proceeds.

This invention will be fully understood from the following description read in connection with the accompanying drawing, said drawing forming a part of this specification and being a diagrammatic elevational view, partly in section, of a suitable apparatus for carrying out the process of the invention.

Referring to the drawing, reference numeral 1 designates a line through which acid sludge flows to pump 2. This acid sludge may be at room temperature or slightly above, or, if the acid sludge is of extremely high viscosity, it may be preheated or diluted to the extent necessary to give a flowable and pumpable material. The acid sludge passes from pump 2 through line 3 to the second heater 4. Heater 4 may take any suitable form such as a rotating kiln or a ribbon mixer. The drawing shows this heater in the form of a ribbon mixer, the mixing ribbons 5 being rotated by motor 6.

Acid sludge coke at a temperature in the range 500–750° C., more or less, passes by line 7 to heater 4. The acid sludge and the highly heated acid sludge coke are intermixed in heater 4 and the resulting mixture is gradually propelled therethrough by means of rotating ribbons 5. During passage through heater 4, the acid sludge is heated and decomposed by the contained heat of the acid sludge coke introduced through 7. Volatile decomposition products pass from heater 4 through line 8.

Solid decomposition products of acid sludge introduced through line 3, together with acid sludge coke introduced through line 7, pass from heater 4 through line 9 and thence to hopper 10. The temperature of these solids is in the range 200–260° C., more or less. The solid mixture passes from hopper 10 to the venturi throat of injection feeder 11 where the solids become suspended in a stream of air from low pressure blower 12 and the suspension is conveyed through line 13 to solids separator 14. Air employed for conveying these solids is discharged through line 15 while the separated solids pass through line 16 to dip leg 17 in the first heater 18.

As shown in the drawing heater 18 contains a bed of fluidized solids. This heater consists of a vertical cylindrical vessel containing a bed of acid sludge coke particles maintained in the fluidized or pseudo-liquid state by methods and means to be described. The upper level of this bed of fluidized acid sludge coke particles is generally indicated by 19 while the bed rests on perforated plate 20.

A stream of gas passes through line 21 and enters heater 18 below perforated plate 20. This gas passes through the perforations of plate 20 and, in moving upward through the bed of acid sludge coke particles in heater 18, maintains this bed in the fluidized or pseudo-liquid state.

The gas entering heater 18 through line 21 is air or a mixture of air and an inert gas. The function of this gas is two fold, (a) to maintain the bed of acid sludge coke particles in fluidized or pseudo-liquid form and (b) to burn sufficient acid sludge coke to heat and maintain the bed of acid sludge coke particles at a temperature in the range 500–750° C., more or less. To maintain the bed of acid sludge coke particles in fluidized or pseudo-liquid state requires that the gas be passed upward therethrough at a superficial linear velocity of about 2.5 meters per second, more or less, the exact velocity required depending upon the average particle size of the acid sludge coke particles, the degree of fluidization desired, and other factors. (Superficial linear velocity is the velocity calculated for an empty cylindrical vessel of the same internal diameter as 18, the gas volume being corrected for the pressure and temperature conditions that exist in heater 18.) Gas requirements for fluidization fix the total quantity of gas to be introduced through line 21. The amount of air that this gas contains is determined by such factors as the temperature level to be maintained in heater 18, the magnitude of various heat losses, and the like.

Gas, carrying a small quantity of acid sludge coke particles in suspension, leaves the upper level 19 of the fluidized bed and enters cyclone separator 22 through port 23. Separated solids return through dip leg 24 to the fluidized bed while cleaned gas is discharged through line 25. Since this gas is at a high temperature, it may be passed through a waste heat boiler or other heat recovery device if desired.

The acid sludge coke requirements of heater 4 pass through solids transfer line 26, slide valve 27 and line 7 to heater 4. Net production of acid sludge coke passes through solids transfer line 28 to coke cooler 29 and thence through a screw conveyor, a star feeder 30, or a similar device, to storage. The coke may be cooled in 29 by any conventional means such as a water quench, indirect heat exchange with a cold liquid or gas or by passing a cold inert gas through the retort.

The size of heater 18 is such that the average holding time of an acid sludge coke particle therein is at least one minute. With a temperature of 650–675° C. therein, a holding time of about five minutes is sufficient to give a readily activatable acid sludge coke of low volatile combustible matter content and exhibiting a high chemical reactivity. Obviously, the size of heater 18 may be such as to give any desired average holding time therein greater than the minimum set forth but excessively long holding times increase investment and operating costs of the unit and result in a decreased net production of acid sludge coke.

While the solids leaving second heater 4 are preferably at a temperature in the range 200–260° C., more or less, they may, if desired, be at any higher temperature up to just below the temperature of the acid sludge coke entering heater 4. It is obvious however that as the temperature difference between material entering heater 4 through line 7 and material leaving heater 4 through line 9 decreases, the required weight ratio of heated acid sludge coke to acid sludge increases. Accordingly, it is best to maintain the temperature of material withdrawn from heater 4 through line 9 at as low a level as is consistent with complete decomposition of the acid sludge introduced into heater 4 through line 3.

Illustrative of the results obtained when employing the apparatus described and shown in the drawing the following data covering a specific embodiment of the invention are presented:

Acid sludge was charged to heater 4 at a rate of 1887 kilograms per hour. Simultaneously, acid sludge coke at a temperature of 650° C., was passed through line 7 to heater 4 at a rate of 4160 kilograms per hour. Vaporous decomposition products were evolved through line 8 at a rate of 5.6 cubic meters (standard conditions) per minute, about two thirds of this gas by volume being sulfur dioxide. Some 5060 kilograms per hour acid sludge coke were taken from the exit of heater 4 through line 9 and transported to heater 18.

Gas was passed upward through heater 18 at a rate of 12.75 cubic meters (standard conditions) per minute. This gas consisted of inert gas containing sufficient air to maintain a temperature of 650° C. in heater 18. Withdrawal of 4160 kilograms per hour acid sludge coke from heater 18 for charging to heater 4 has already been mentioned. In addition, 312 kilograms per hour acid sludge coke were withdrawn from heater 18 through star feeder 30, this representing the net coke production of the unit. The coke contained 3.4% volatile combustible matter. (Herein, volatile combustible matter is the loss, in percent by weight, observed when moisture free acid sludge coke is heated to a temperature of 950° C.) Acid sludge cokes prepared in accordance with this invention contain from about 2% to 5% volatile combustible matter, the exact amount depending upon the temperature and coke holding time in heater 18. Acid sludge cokes prepared in accordance with this invention exhibit a high chemical reactivity and are readily activatable by conventional activation procedures.

It is obvious that many modifications may be made in the apparatus shown in the drawing and previously described. As has been stated, heater 4 may take the form of a rotary kiln. Heater 18, instead of being a bed of fluidized solids as described and shown, may be a Herreshoff rotary furnace or a "moving bed" (as opposed to a fluidized bed) heater. These alternate forms of heater 18 are especially useful when it is desired to employ acid sludge coke particles of rather large size, such as 2.5 mm. average diameter or larger. If such relatively large particles are employed in a fluidized bed, a high superficial linear velocity is necessary to maintain the relatively large particles in the fluidized or pseudo-liquid state. This results in large power requirements for compressing the gas and the large volume of gas leaving heater 18 through line 25 represents a larger quantity of heat.

If desired, acid sludge coke removed through star feeder 30 may be classified according to size and the more desirable sizes (usually the larger sizes) may be retained as net acid sludge production of the unit while the less desirable sizes (usually the smaller sizes) may be returned to the apparatus. Also, materials such as black liquor, molasses, and the like may be added to hot acid sludge coke net production to produce coke aggregates of comparatively large size.

The acid sludge may be processed in admixture with carbonaceous materials in addition to acid sludge coke, such as saw dust, wood chips, nut shells, grape seeds, petroleum and coal tar pitches, coal, peat, lignite, brown coal, and the like. One or more of these materials may be dispersed or suspended as a finely divided solid in the acid sludge charge and introduced into the unit through line 1 or may be charged to heater 18, for example by introduction into hopper 14 by means of a screw conveyor, star feeder or similar device.

Several of the materials mentioned (for example, the cellulosic waste products) normally produce a chemically reactive char on being carbonized but others of these materials normally produce an unreactive coke on carbonizing (coal). It has been found that when materials that normally give an unreactive coke on carbonizing are carbonized in the presence of acid sludge in accordance with the procedures of this invention, the resulting coke formed is chemically reactive. Accordingly, on processing one or more of these materials, or materials of a similar nature, in the presence of acid sludge in accordance with the procedure of this invention, an increased production of chemically reactive coke is obtained. If coking or semi-coking coal is to be processed in the presence of acid sludge, it is advisable initially to subject the coal to a conventional preheating and oxidizing procedure to reduce the coking tendencies thereof.

The reactivity of the acid sludge coke produced by the process of this invention may be further enhanced by incorporating catalytic amounts of alkali or alkaline earth metal oxides, hydroxides, carbonates and the like in the feed to the unit. Such materials are added at any convenient point in the processing cycle, for example, the selected material or materials may be introduced into separator 14 at a controlled rate by means of a screw conveyor, star feeder or similar device.

Be it remembered, that while this invention has been described in connection with specific details and specific embodiments thereof, these details and embodiments are illustrative only and are not to be considered limitations on the spirit or scope of said invention except in so far as these may be incorporated in the appended claims.

I claim:

1. A process for the production of acid sludge coke comprising, in combination, admixing one part by weight acid sludge with not more than about three parts by weight acid sludge coke particles heated to a temperature sufficient to produce an acid sludge-acid sludge coke mixture having a temperature at least as high as the decomposition temperature of the acid sludge, removing volatile decomposition products evolved by the resulting mixture from the process cycle, transporting acid sludge coke resulting from the thermal decomposition of said mixture to a zone wherein said acid sludge coke is maintained as a bed exhibiting continuous movement, heating said continuously moving bed by passing an oxygen containing gas therethrough, removing a first stream of heated acid sludge coke from said continuously moving bed and admixing with acid sludge as previously set forth, removing a second stream of heated acid sludge coke from said continuously moving bed at the rate necessary to maintain the weight of said continuously moving bed approximately constant and discharging said second stream of heated acid sludge coke from the process cycle.

2. A process for the production of acid sludge coke comprising, in combination, admixing one part by weight acid sludge with not more than about three parts by weight acid sludge coke heated to a temperature in the approximate range 500° to 750° C., removing volatile decomposition products evolved by the resulting mixture from the process cycle, transporting acid sludge coke resulting from the thermal decomposition of said mixture to a fluidized bed of acid sludge coke, maintaining said bed in the fluidized state and at a temperature in the approximate range 500° to 750° C. by passing an oxygen containing gas therethrough, removing a first stream of heated acid sludge coke from said fluidized bed and admixing with acid sludge as previously set forth, removing a second stream of heated acid sludge coke from said fluidized bed at the rate necessary to maintain the weight of said fluidized bed approximately constant, and discharging said second stream of heated acid sludge coke from the process cycle.

3. The process of claim 2, further characterized by the fact that the fluidized bed of acid sludge coke is maintained at a temperature in the approximate range 600° to 750° C.

References Cited in the file of this patent

UNITED STATES PATENTS

| | | |
|---|---|---|
| 1,983,943 | Odell | Dec. 11, 1934 |
| 2,028,725 | Rumple | Jan. 21, 1936 |
| 2,605,171 | Maurer | July 29, 1952 |
| 2,735,806 | Molstedt et al. | Feb. 21, 1956 |